United States Patent [19]
Feliz

[11] 3,789,618
[45] Feb. 5, 1974

[54] AUXILIARY DRIVE FOR ENGINE DRIVEN AIR CONDITIONER

[76] Inventor: Jack M. Feliz, 34-808 Via Echo, Palm Springs, Calif. 92262

[22] Filed: Aug. 14, 1972

[21] Appl. No.: 280,671

[52] U.S. Cl.................................. 62/236, 62/323
[51] Int. Cl............................................ F25b 27/00
[58] Field of Search............ 62/236, 226, 228, 323

[56] References Cited
UNITED STATES PATENTS

| | | | |
|---|---|---|---|
| 2,382,667 | 8/1945 | Ryan.................................. | 62/236 |
| 2,962,873 | 12/1960 | Anderson............................ | 62/236 |
| 3,545,222 | 12/1970 | Petrzuek............................. | 62/236 |
| 3,606,752 | 9/1971 | Shaw................................... | 62/236 |

*Primary Examiner*—Meyer Perlin
*Attorney, Agent, or Firm*—Harris, Kern, Wallen & Tinsley

[57] ABSTRACT

An auxiliary electrical drive means is provided to alternately operate the components of a conventional internal combustion engine driven air conditioner, thus eliminating the need for the secondary roof mounted air conditioner, which is normally provided on recreational vehicles or the like. The dual operation of the aforementioned engine driven air conditioner is accomplished by the means of a pair of self-contained centrifugal clutch assemblies, suitable mounted to the conventional water pump and the air conditioner compressor, thereby automatically disconnecting the power train of the drive means that is not running.

3 Claims, 5 Drawing Figures

PATENTED FEB 5 1974 3,789,618

AUXILIARY DRIVE FOR ENGINE DRIVEN AIR CONDITIONER

BACKGROUND OF INVENTION

This invention relates to recreational vehicles or the like, equipped with internal combustion engine driven air conditioners for use when the vehicle engine is in operation, and is further equipped with an additional electrically driven roof mounted air conditioner for use when the conventional engine is not in operation and the vehicle is located at a parking site provided with an external electrical power source.

The chief aim of the present invention is to eliminate the need for a roof mounted air conditioner by providing an auxiliary electrical drive means for the internal combustion engine driven air conditioner compressor and the radiator-condenser fan, and further, by utilizing the remainder of the conventional air conditioner system in its entirety, thereby providing refrigerated air from a single air conditioner, regardless of whether the vehicle engine is in operation or stopped at a parking site provided with an electrical hookup.

SUMMARY AND OBJECTS OF INVENTION

A general object of the present invention is to provide an auxiliary drive means capable of alternately driving the engine driven air conditioner compressor and the radiator-condenser fan, by the means of a pair of centrifugal clutches, suitably mounted in the power train between the main and auxiliary drive means.

Another object of the present invention is to provide a water pump and an auxiliary compressor clutch means which require no external manipulation or load sensing equipment, and are capable of automatically shifting the load to the selected drive means and disengaging the idle means.

Another object of the present invention is to eliminate the initial cost, installation charges, duplication of refrigeration effort, and cost of repairs to the roof mounted air conditioner.

Another object is the elimination of a high topside weight with a commensurate reduction of upsetting moments of force, thus contributing to the stability of the vehicle and the safety of the occupants.

Still another object of the present invention is to eliminate the wind resistance and weight created by the roof mounted air conditioner with commensurate reduction in fuel consumption.

Another object, in addition to providing motor homes and campers with a single air conditioner to supply their total requirement, is to provide the travel trailer tow vehicle with an identical air conditioner auxiliary electrical drive means as previously described and further providing suitable ducting, conduits, and receptors to receive the plug-in electrical power, the control circuits and the flexible air conditioner supply and return ducts from the travel trailer, thus eliminating the need for the travel trailer roof mounted air conditioner.

Another object of the present invention is to reduce the noise level and toxic pollution of the atmosphere, caused by busses and trucks when stopped at bus stations or fuel and rest areas, where it is the normal practice to leave their internal combustion engines running, to provide air conditioning comfort for the passengers and/or refrigerated cargo. It is feasible to provide 115V AC electrical hookups at the above company-owned bus stations and coin operated meter hookups at public fuel and rest areas, thereby supplying the electrical power necessary to provide air conditioning and reduce one of the major contributing causes of noise and air pollution. It is also feasible to provide the above electrical services and auxiliary drive means for power boats and aircraft.

Another object is to provide the clutch devices which are automatically operable; and which, moreover, are light in weight, relatively simple in construction and sturdy against easy derangement over long periods of use.

The foregoing objects, advantages, features and results of the present invention, together with various other objects, advantages, features and results thereof which will be evident to those skilled in the art to which the invention relates in the light of this disclosure, may be achieved with the exemplary embodiments of the invention illustrated in the accompanying drawings and described in detail hereafter.

DESCRIPTION OF EXEMPLARY EMBODIMENTS OF THE INVENTION

Figure 1:
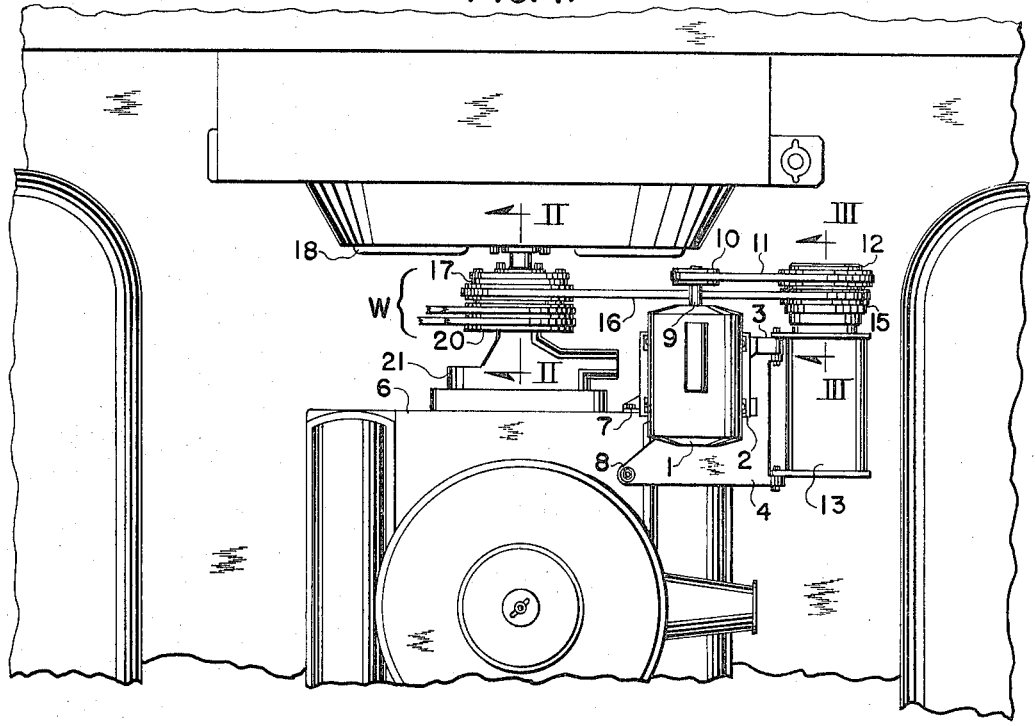
FIG. 1 is a fragmentary plan view illustrating the general arrangement of the auxiliary electric motor drive means for a conventional internal combustion engine driven air conditioner.

Referring to FIG. 1 of the drawings, the auxiliary drive means for a conventional internal combustion engine driven air conditioner, comprises a 115V AC electric motor 1, or the like, secured to the motor base 2, in turn secured to the brackets 3 and 4. The latter in turn are secured to the internal combustion engine 6 as by bolts 7 and 8. When the motor 1 is energized, a relay (not shown) will close the air conditioner circuit and open the engine 6 ignition circuit, as will be described later. The motor 1 will rotate in a clockwise direction as viewed when facing the front of engine 6. The drive shaft 9 of motor 1 is provided with a V belt pulley 10, or the like, which in turn drive V belt 11, and the latter in turn drives the auxiliary compressor clutch pulley assembly 12, as will be described later in detail. The auxiliary compressor clutch pulley assembly 12 drives the compressor 13, which in turn drives the drive plate pulley assembly 15 and in turn drives the V belt 16, which the latter in turn drives the water pump clutch drum pulley assembly 17, which in turn drives the conventional radiator-condenser fan 18. The belt 16 and pulleys 15 and 17 thus constitute a belt and pulley means interconnecting the compressor 13 and the fan 18.

WATER PUMP CLUTCH ASSEMBLY

Figure 2:
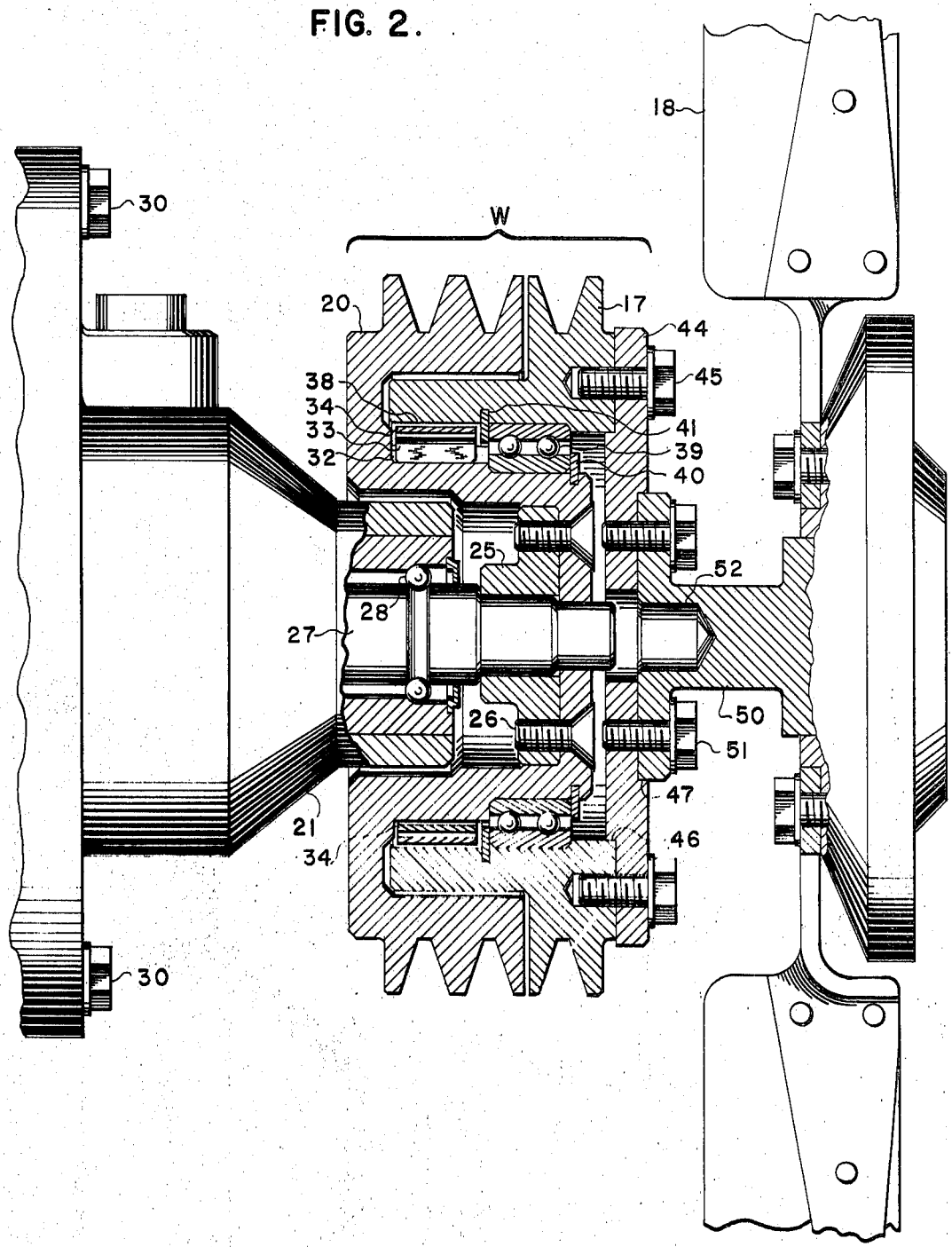
FIG. 2 is an enlarged fragmentary side elevational view partly in section, taken as indicated along the angles arrows II—II of FIG. 1, illustrating details of the water pump clutch assembly.

Referring now to the water pump clutch assembly W, as best seen in FIG. 2, includes the water pump pulley assembly 20 which is driven by a pair of V belts connected to the drive pulleys (not shown) on engine 6. The water pump pulley assembly 20 is secured to the conventional water pump drive shaft hub 25 as by screws 26. The conventional water pump drive shaft 27 is journaled on bearings 28, supported within the water pump housing 21, the latter in turn is secured to the engine 6 as by screws 30. The known types of centrifugal clutches may assume various forms but hereinafter the coil spring type will be used for illustrative purposes. The hub of the pulley assembly 20 is provided with a groove 32 to receive and secure the right angled internal terminus 33, of the flat spiral wound spring 34. The spring 34 is wound in a clockwise direction as viewed when facing the engine 6. The external coil of spring 34, is shown in a disengaged position from the clutch drum pulley assembly 17, which will be described later in detail. The disengagement from the water pump pulley assembly 20, permits a free wheeling rotation of the clutch drum pulley assembly 17, and the attached radiator-condenser fan 18, when driven by the auxiliary drive means. The clutch drum pulley assembly 17 is suitably journaled on bearings 39, the latter in turn is supported by the hub of the water pump pulley assembly 20. The bearing 39 is secured to the above mentioned hub by the bearing retainer ring 40. The clutch drum pulley assembly 17 is secured to the bearing 39 by the drum retainer ring 41. The cover plate 44 is secured to the pulley assembly 17 as by screws 45. The cover plate 44 is provided with self-centering recesses 46 and 47 to insure alignment of the conventional drive shaft 50 of the fan 18. The shaft 50 is secured as by screws 51 to the cover plate 44. It is also feasible to provide other centering means for the drive shaft 50, for example the installation of a centering boss on plate 44 to receive the center hole 52 of the fan drive shaft 50.

When the auxiliary drive motor 1 is deenergized and the engine 6 is started, the rotation of the water pump pulley assembly 20 generates a centrifugal force tending to make the rotating spring 34 move away from the center of rotation until it engages the inner surface of the clutch drum at 38, thus transmitting the torque from engine 6 to the clutch drum pulley assembly 17, and simultaneously driving the fan 18, the V belt 16 (FIG. 1), and the drive plate pulley assembly 15 of the compressor 13.

AUXILIARY COMPRESSOR CLUTCH ASSEMBLY

Figure 3:
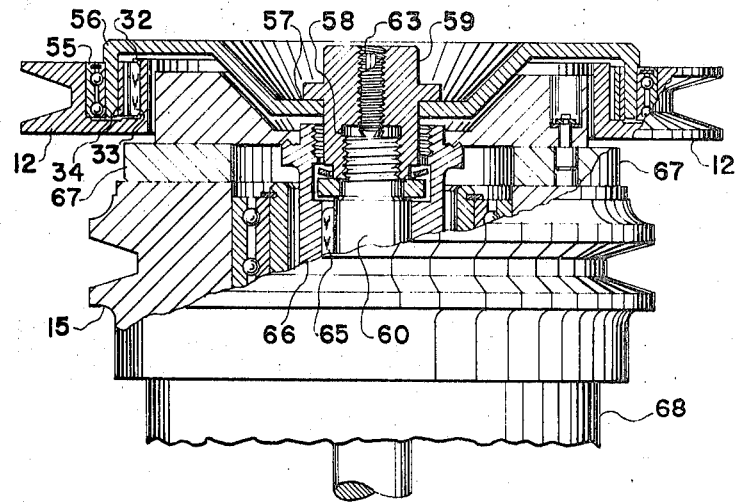
FIG. 3 is an enlarged fragmentary side elevational view partly in section, taken as indicated along the angles arrows III—III of FIG. 1, illustrating details of the auxiliary compressor clutch assembly, adapted for mounting directly to the distal end of the conventional air conditioner compressor drive shaft.

Referring now to the auxiliary compressor clutch assembly, as best seen in FIG. 3, it includes the clutch pulley assembly 12, suitably journaled on bearings 55. The latter in turn is supported by the external face of the clutch drum 56. The centrifugal clutch assembly is identical to the clutch assembly described in FIG. 2 and the same reference numerals are assigned to the identical parts. The hub of the pulley assembly 12 is provided with a groove 32, in which the internal end 33 of spring 34 is secured. The spring 34 is shown engaged to the inner surface of the clutch drum 56, thereby transmitting the torque from the electric motor 1 to the clutch drum 56. The latter in turn is secured at 57 to the drum hub 58. The drum hub 58 is adapted to secure directly to the distal end of the conventional compressor drive shaft 60 in lieu of the conventional lock nut 61 shown in FIG. 5. The distal end portion 59 of the hub 58 is suitably shaped for engagement of a socket wrench. The set screw 63 is provided to lock the hub 58 to the shaft 60. This concludes the description of the above auxiliary compressor clutch assembly. However, a brief description will be given of some of the conventional compressor parts, in order to better illustrate the association and continuity of the auxiliary and main power trains. The auxiliary power train will be described first. The previously described motor 1 and auxiliary clutch assembly 12 drives the compressor shaft 60 and key 65, which in turn drives the slidably engaged hub 66 of the driven clutch plate 67. The latter in turn drives the drive plate pulley assembly 15, when the above mentioned clutch plate 67 is loaded by the solenoid 68. The drive plate pulley assembly 15 drives V belt 16 (FIG. 1) and in turn drives the water pump clutch drum pulley assembly 17, as previously described, when the motor 1 is energized.

When the motor 1 is deenergized, the spring 34, (FIG. 3) contracts and disengages the auxiliary compressor clutch assembly 12 from the clutch drum 56, thereby permitting the compressor 13 (FIG. 1) to be driven in a conventional manner by the engine 6, as previously described.

Further amplifying the above conventional compressor drive means, when the engine 6 is in operation and the air conditioning is not desired, the circuit is deenergized in a conventional manner, and the solenoid 68 unloads the driven clutch plate 67, thereby disengaging the compressor and permitting the drive plate pulley assembly 15 to idle.

Figure 4:
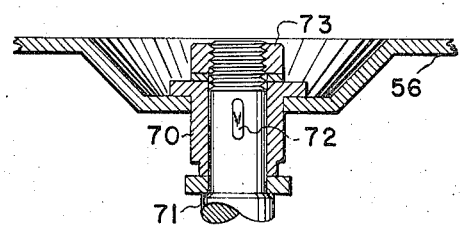
FIG. 4 is a fragmentary side elevational view corresponding to FIG. 3, illustrating a mutually modified compressor drive shaft and auxiliary compressor clutch drum hub.

FIG. 4 illustrates a modified auxiliary compressor clutch drum hub 70 and a mutually modified compressor drive shaft 71. The principal change is that the compressor shaft 71 has been extended and provided with the key 72 to engage the extended hub 70. A lock nut 73 is provided to secure the clutch drum hub 70 to the drive shaft 71. The above hub and shaft modification provides an alternate means of securing the clutch drum hub to the distal end of the compressor shaft, should the alignment of the drum hub 58 to shaft 60 of the first embodiment of the invention permit excessive run out of the auxiliary compressor clutch pulley assembly 12.

Figure 5:
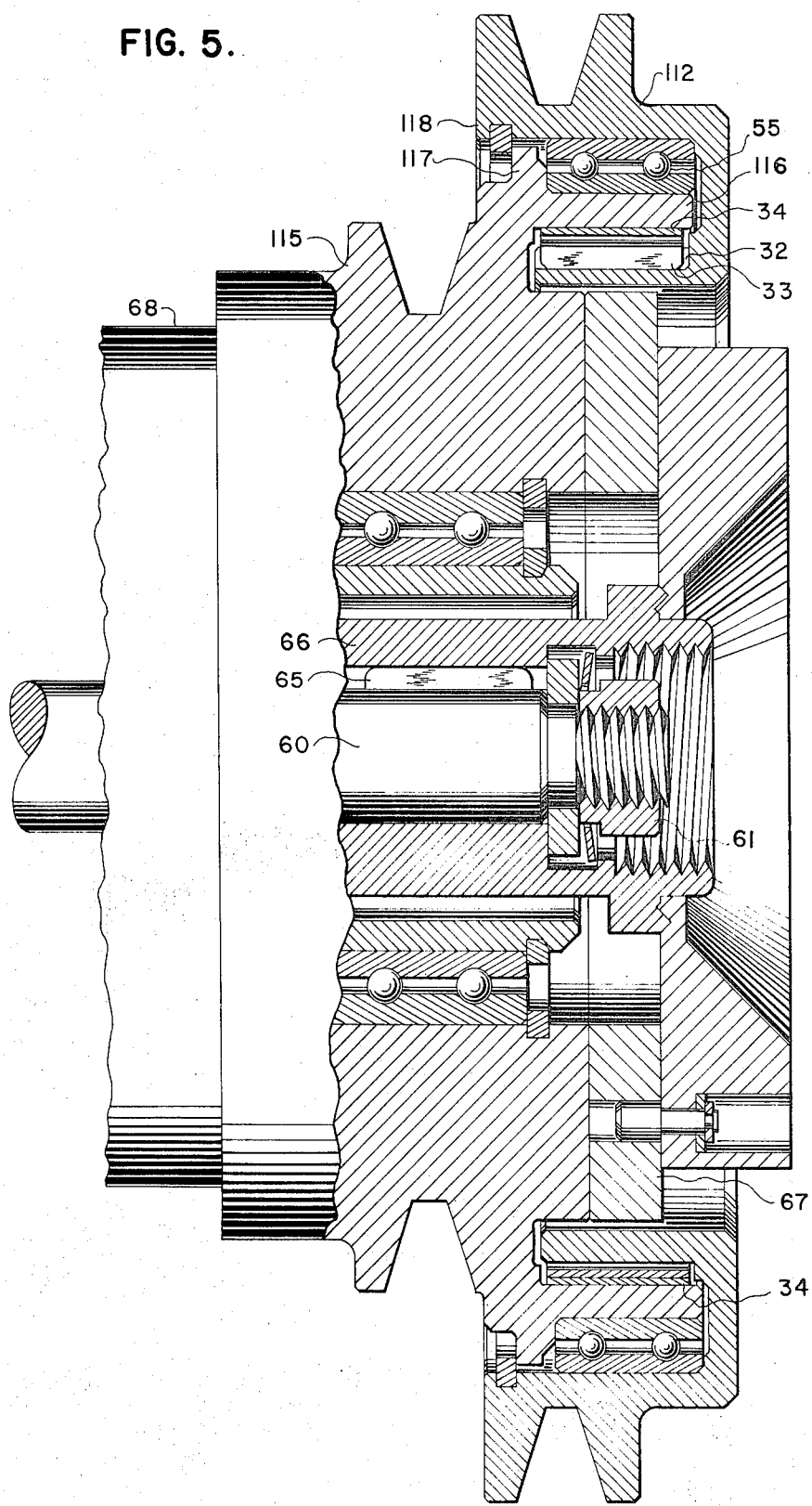
FIG. 5 is an enlarged fragmentary side elevational view corresponding to FIG. 3, illustrating a mutually modified auxiliary compressor clutch and drive plate pulley assembly, adapted for mounting directly to the conventional air conditioner compressor.

FIG. 5 illustrates a modified auxiliary compressor clutch and drive plate pulley assembly. The components having their counterparts in the first described embodiment of the invention are identified by the same reference numerals and only those features requiring a change of parts are identified by new reference numerals in the "100" series. The principal change is that the drive plate pulley assembly 115 is provided with an integral clutch drum 116 and lock rim 117. The auxiliary clutch pulley assembly 112 is suitably journaled on bearings 55, and the latter in turn is supported by the clutch drum 116, integral with the drive plate pulley assembly 115. The clutch pulley assembly 112 is secured to the drive plate pulley assembly 115 by the retainer ring 118. The hub of the clutch pulley assembly 112 is provided with a groove 32 to receive the internal terminus 33, of the flat spiral wound spring 34. The spring 34 is wound in a clockwise direction and functions in an identical manner as previously described in the first embodiment of the present invention. The above mentioned modification provides certain advantages in that the overhang of the clutch pulley assembly is reduced and the compressor shaft seal (not shown) may be replaced in a conventional manner without removing the clutch drum hubs 58 or 70 as shown in FIGS. 3 and 4 respectively.

Another modification could be the elimination of the above mentioned auxiliary compressor clutch assemblies 12 and 112 of FIGS. 3 and 5, respectively and, substitute in lieu thereof, a V-belt pulley integral with the periphery of the drum 56, FIG. 3, and the periphery of the drum 116, FIG. 5. The above integral pulley arrangement will connect motor 1 directly to the compressor shaft 60, FIG. 3, and to the drive plate pulley assembly 115, FIG. 5. The principal difference caused by the absence of the above mentioned clutches 12 and 112 would be that when the engine 6 is in operation it would continuously drive the idle motor 1, when connected to the drive plate pulley assembly 115, FIG. 5, and intermittently, when the air conditioner system is activated in the conventional manner through the means of the drive plate pulley assembly 15 and the loaded clutch plate 67, FIG. 3. The above arrangement will permit the motor 1, when energized to drive the compressor 13, the clutch drum pulley assembly 17 and the radiator-condenser fan 18, FIG. 1, in an identical manner as previously described in the first embodiment of this invention. The relative merits of the above mentioned auxiliary compressor clutch and the direct drive integral pulley assemblies, are both mechanically feasible and their economic values could be based on the additional cost of fuel consumed to drive the idle motor 1, during the vehicles life expectancy versus, the cost to manufacture and maintain the auxiliary compressor clutch assembly.

ELECTRICAL CIRCUIT

The conventional electrical circuit is used in its entirety for the operation of the dual driven air conditioner with the exception, that a circuit control relay should be installed to override the ignition switch, thus closing the circuit to the compressor clutch solenoid 68 and the blower motor (not shown) and further, to open the ignition circuit to engine 6 when the auxiliary drive motor 1 is energized. The former is required for the operation of the air conditioner when the ignition switch is in the off position. The latter is a precautionary measure to prevent the operator from inadvertently starting the engine when the motor 1 is in operation, thus causing undue wear to the dual clutches. The installation of a 115V AC/12V DC converter is required to provide a floating charge to the battery while energizing the above mentioned clutch solenoid and the blower motor.

Although two exemplary embodiments and modifications of the invention have been disclosed herein for purposes of illustration, it will be understood that various other changes, modifications and substitutions may be incorporated without departing from the spirit of the invention as defined by the claims which follow.

I claim as my invention:

1. An air conditioner drive system for a motor vehicle which includes a conventional liquid cooled internal combustion engine having at the front thereof a coolant pump drive shaft, having a fan coaxial with the coolant pump drive shaft, and having a coolant radiator ahead of the fan, said motor vehicle further including a conventional automotive air conditioner having a compressor and having a condenser ahead of the fan, said air conditioner drive system including:
    a. means including a first centrifugal clutch for connecting the coolant pump drive shaft to the fan and the compressor when the engine is operating;
    b. an electric motor mounted adjacent the front of and parallel to the engine; and
    c. means including a second centrifugal clutch for connecting said electric motor to the compressor and the fan when said electric motor is operating and the engine is not.

2. An air conditioner drive system as defined in claim 1 wherein the first clutch mentioned includes means for frictionally coupling the coolant pump drive shaft to the fan when the engine is operating, and wherein said second clutch includes means for frictionally coupling said electric motor to the compressor when said electric motor is operating, said system including pulley and belt means interconnecting the fan and the compressor so that the fan drives the compressor when the engine is operating and the compressor drives the fan when said electric motor is operating.

3. An air conditioner drive system as set forth in claim 2 including pulley and belt means connecting the coolant pump drive shaft to said first clutch, and pulley and belt means connecting said electric motor to said second clutch.

* * * * *